April 26, 1927.

H. W. NAYLOR

DILATOR

Filed April 23, 1926

1,625,906

Inventor

H. W. Naylor.

By Lacey & Lacey, Attorneys

Patented Apr. 26, 1927.

1,625,906

UNITED STATES PATENT OFFICE.

HOWARD W. NAYLOR, OF MORRIS, NEW YORK.

DILATOR.

Application filed April 23, 1926. Serial No. 104,125.

This invention relates to veterinary dilators and more particularly to a dilator for cows' teats, the dilator being intended principally for employment in the treatment of teats having obstructions or those which are bruised and sore, teats affected with the disease known as "spider teats" and teats which by reason of some peculiarity are hard to milk.

One of the objects of the present invention is to provide a teat dilator which may be readily inserted into the milk duct of the teat and readily removed therefrom without inconvenience to the animal and which when once inserted, will be retained in place.

Another object of the invention is to provide a dilator which will possess a soft surface and which will, therefore, be non-irritating and which is of such character as to adapt the dilator to serve likewise the purpose of an applicator for medicaments possessing, for example, antiseptic and healing properties.

Another object of the invention is to provide a dilator so formed as to adapt it to be readily inserted into the milk duct of a cow's teat which requires dilation and the invention contemplates providing the dilator with means whereby it may be conveniently manipulated at the time it is inserted and which means will also insure against entrance of the dilator into the duct beyond the distance required to effect the desired results so that there is no likelihood of the dilator entering the milk duct to a point where it could not be conveniently extracted.

Another object of the invention is to provide a dilator of the class referred to which will be capable of retaining a suitable medicament so that it will likewise serve the purpose of an applicator.

Figure 1:
Figure 1 is a perspective view of the dilator embodying the invention.
Figure 2:
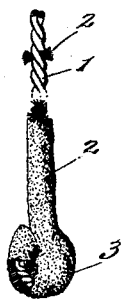
Figure 2 is a detail view partly in elevation and illustrating the lower portion of the dilator with a portion of the stem exposed to illustrate the construction thereof.
Figure 3:
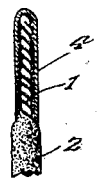
Figure 3 is a view similar to Figure 2, illustrating the upper or tip end of the dilator.

The dilator comprises a stem which is indicated by the numeral 1 and which is preferably formed from two strands of wire which are twisted together in spiral form as most clearly shown in Figure 2 of the drawings, and at the time these strands are united to each other by twisting, short fiber strands, indicated by the numeral 2, are applied between the wires and are secured in place by the twist formed in the wire strands. The fiber strands 2 extend throughout the entire length of the twisted wire strands which constitute the stem 1 of the dilator and it will be evident by reference to the drawings, that in this manner, the stem of the dilator is provided with a soft absorbent covering of fibrous material for contact with the walls of the milk duct into which the dilator is to be inserted, so that no portion of the metal stem will come in contact with the said walls of the duct.

In order that the dilator may be conveniently manipulated and likewise in order to prevent its entering the milk duct to such distance that its extraction would be difficult, the fiber covered stem at one end is bent to approximately circular form so as to provide a finger piece 3 which is, of course, of greater dimensions than the stem itself, the finger piece being adapted to be grasped between the thumb and forefinger in inserting the dilator into the milk duct of the teat to be dilated and treated. At this point it will be evident that when the dilator is inserted into the milk duct, the head or finger piece 3 will engage against the end of the teat so that the extent to which the dilator enters the milk duct is limited.

In order to provide for more ready insertion of the dilator into the milk duct of the teat and likewise completely cover the ends of the twisted wire strands comprising the stem of the dilator, so that they cannot cause injury to the wall of the duct, a quantity of wax or other similar material is applied to the terminal portion of the dilator and pressure is exerted against opposite sides of this portion and the dilator is rotated so as to compact the projecting ends of the fibrous strands 2 and thus provide a smooth entering tip indicated by the numeral 4, of slightly less diameter than the stem of the dilator including the said fibrous strands.

In preparing the dilator for use, it is immersed in a solution possessing antiseptic properties and until the fibrous strands 2 have become saturated, whereupon it is removed from the solution and permitted to dry and then packed in any suitable healing and soothing medicament which may, for example, be in the nature of a salve, and is then ready to be inserted at any time, tip end first, into the milk duct of the teat to be dilated and treated, and permitted to remain in place for any suitable period of time.

In practice, a considerable quantity of the fibrous strands 2 will be arranged between the inter-twisted wire strands comprising the stem of the dilator so that no portion of the stem can come in contact with the wall of the milk duct into which the dilator is inserted and, likewise, so that the dilator will possess a soft and yieldable surface, thereby avoiding further irritation of the milk duct.

The tip 4, being of less diameter than the body of the dilator, will provide for more ready insertion of the dilator into the milk duct and due to the application of a waxy material thereto, it will present a smooth surface to be rendered slippery upon contact with the fluid present in the duct and, therefore, materially facilitate the insertion of the dilator without the necessity of applying any appreciable force or twisting or turning the same at the time of insertion.

Having thus described the invention, what I claim is:

1. A dilator comprising a stem having a covering of fiber strands projecting radially therefrom.

2. A dilator consisting of a stem comprising wire strands inter-twisted throughout their length, and fiber strands interposed between the wire strands and confined at their intermediate portions thereby, the end portions of the fiber strands projecting radially from the stem whereby to entirely cover said stem.

3. A dilator comprising a stem having a covering of fiber strands, the fiber strands at one end of the stem being constricted and bonded by a binder medium to provide a tip.

4. A dilator comprising a stem having a covering of fiber strands, the fiber strands at one end of the stem being constricted and bonded by a waxy binder medium to provide a tip of less diameter than the body portion of the dilator.

5. A dilator comprising a stem having a covering of fiber strands, said stem at one end being bent upon itself to provide a portion constituting a finger piece and also a stop to limit the insertion of the dilator into a duct.

6. A dilator comprising a stem having a covering of fiber strands, the fiber strands at one end of the stem being constricted and bonded by a waxy binder medium to provide a smooth tip, the said stem at its other end being provided with a finger piece.

7. A dilator comprising a stem consisting of a pair of inter-twisted wire strands, and fiber strands interposed between and confined at their intermediate portions by and between the said strands and having their end portions projecting radially with relation to the axis of the stem, the said projecting end portions of the fiber strands at one end of the stem being twisted circumferentially about the stem and constructed by a waxy binder medium to provide a tip of less diameter than the body of the dilator.

In testimony whereof I affix my signature.

HOWARD W. NAYLOR. [L. S.]